(12) United States Patent
Iguchi et al.

(10) Patent No.: US 10,368,549 B2
(45) Date of Patent: Aug. 6, 2019

(54) APPARATUS AND METHOD FOR CUTTING NOODLE

(75) Inventors: Yoshitaka Iguchi, Gardena, CA (US);
Koshi Minamitani, Osaka (JP);
Mitsuru Tanaka, Osaka (JP)

(73) Assignees: NISSIN FOOD HOLDINGS CO., LTD., Osaka (JP); NISSIN FOODS (U.S.A.) CO., INC., Gardena, CA (US)

( * ) Notice: Subject to any disclaimer, the term of this patent is extended or adjusted under 35 U.S.C. 154(b) by 796 days.

(21) Appl. No.: 13/016,233

(22) Filed: Jan. 28, 2011

(65) Prior Publication Data

US 2012/0192687 A1 Aug. 2, 2012

(51) Int. Cl.
| | |
|---|---|
| B26D 1/12 | (2006.01) |
| A21C 11/10 | (2006.01) |
| B26D 1/40 | (2006.01) |
| B26D 1/62 | (2006.01) |
| B26D 7/06 | (2006.01) |

(52) U.S. Cl.
CPC .............. A21C 11/10 (2013.01); B26D 1/40 (2013.01); B26D 1/62 (2013.01); *B26D 7/0625* (2013.01); *Y10T 83/04* (2015.04); *Y10T 83/9372* (2015.04)

(58) Field of Classification Search
CPC . B26D 1/125; B26D 1/12; B26D 1/22; B26D 1/157; B26D 2210/02; B26D 7/0625; A21C 9/085; A21C 9/00
USPC ....... 83/343–347, 42, 114, 330–331; 100/97, 100/908
See application file for complete search history.

(56) References Cited

U.S. PATENT DOCUMENTS

| | | | | |
|---|---|---|---|---|
| 1,615,198 | A | * 1/1927 | Blendow | ............... A21C 11/10 425/301 |
| 2,619,051 | A | * 11/1952 | Rice | .............................. 425/298 |
| 2,629,341 | A | 2/1953 | Rice | |
| 2,748,863 | A | * 6/1956 | Benton | ........................... 83/171 |

(Continued)

FOREIGN PATENT DOCUMENTS

| | | |
|---|---|---|
| EP | 2 005 829 A1 | 12/2008 |
| FR | 1.100.262 A | 9/1995 |

(Continued)

OTHER PUBLICATIONS

Jun. 19, 2012 Written Opinion of the International Searching Authority issued in International Application No. PCT/JP2012/000543.

(Continued)

*Primary Examiner* — Sean M Michalski
*Assistant Examiner* — Fernando Ayala
(74) *Attorney, Agent, or Firm* — Oliff PLC

(57) ABSTRACT

A noodle strand cutting apparatus for cutting gelatinized noodle strands used in manufacturing of instant noodles is provided with: a conveyer for conveying at least one bundle of the gelatinized noodle strands; and a rotary cutter arranged above the conveyer and intended to cut, to a predetermined length, the at least one bundle of the gelatinized noodle strands conveyed on the conveyer in a substantially horizontal direction. The rotary cutter is provided with a plurality of blades that extend side by side with a rotational axis in radial directions around the rotational axis, the plurality of blades being spaced from each other in a circumferential direction by predetermined intervals.

10 Claims, 7 Drawing Sheets

(56) References Cited

U.S. PATENT DOCUMENTS

| | | | | |
|---|---|---|---|---|
| 3,217,575 | A * | 11/1965 | Anetsberger | A21C 11/10 83/115 |
| 3,225,718 | A * | 12/1965 | Page | 425/101 |
| 3,310,438 | A * | 3/1967 | Huffman et al. | 429/211 |
| 3,528,334 | A * | 9/1970 | Geschwender | 83/346 |
| 3,555,947 | A * | 1/1971 | Fram | 83/116 |
| 3,616,765 | A * | 11/1971 | griner | 99/450.2 |
| 3,873,290 | A * | 3/1975 | Marzocchi | C03B 37/16 241/222 |
| 3,942,401 | A * | 3/1976 | Roncato | 83/19 |
| 4,275,629 | A * | 6/1981 | McDowell | 83/302 |
| 4,423,551 | A * | 1/1984 | Chmela et al. | 30/142 |
| 4,627,320 | A * | 12/1986 | Fuccaro | B23D 25/14 83/163 |
| 4,637,286 | A * | 1/1987 | Boggs | 83/175 |
| 4,988,528 | A | 1/1991 | Tomoda | |
| 5,555,787 | A * | 9/1996 | Barber et al. | 83/698.11 |
| 5,694,824 | A * | 12/1997 | Jacko et al. | 83/403 |
| 6,007,468 | A * | 12/1999 | Giacometti | 493/341 |
| 6,598,814 | B2 * | 7/2003 | Bascom et al. | 440/88 F |
| 6,986,765 | B2 * | 1/2006 | Sumiya et al. | 606/10 |
| 7,966,909 | B2 * | 6/2011 | Madeira et al. | 76/104.1 |
| 8,591,936 | B2 * | 11/2013 | Pacetti | 424/424 |
| 2002/0174966 | A1 * | 11/2002 | Brauns et al. | 162/280 |
| 2004/0237747 | A1 * | 12/2004 | King | 83/663 |
| 2007/0006696 | A1 * | 1/2007 | Kempski et al. | 83/13 |
| 2008/0022822 | A1 * | 1/2008 | Jacko et al. | 83/403 |
| 2008/0098865 | A1 * | 5/2008 | Magula | 83/37 |
| 2008/0289189 | A1 * | 11/2008 | Khatchadourian | 30/125 |
| 2009/0011099 | A1 * | 1/2009 | Kim et al. | 426/451 |
| 2010/0011922 | A1 * | 1/2010 | Capodieci | 83/14 |
| 2012/0288607 | A1 * | 11/2012 | Takahashi et al. | 426/557 |
| 2013/0251876 | A1 * | 9/2013 | Nagayama | 426/557 |

FOREIGN PATENT DOCUMENTS

| | | |
|---|---|---|
| GB | 2 329 570 A | 3/1999 |
| JP | A-52-128277 | 10/1977 |
| JP | U-7-5386 | 1/1995 |

OTHER PUBLICATIONS

Jun. 19, 2012 International Search Report issued in International Application No. PCT/JP2012/000543.

* cited by examiner

APPARATUS AND METHOD FOR CUTTING NOODLE

BACKGROUND OF THE INVENTION

Field of the Invention

The present invention relates to a noodle strand cutting apparatus, rotary cutter, and noodle strand cutting method that are used to manufacture noodle strands of instant noodles, and more particularly, to those for cutting gelatinized noodle strands.

Description of the Related Art

Many of instant noodles have a length of approximately 20 to 70 cm. However, in recent years, consumer's tastes become diversified, and therefore noodle strands having a shorter length of approximately 1 to 10 cm are also required.

Usually, in manufacturing of the instant noodles, respective steps of: formation of a dough by mixing flour, starch, water, and other materials; rolling; cutting into noodle strands; steaming or boiling; pulling: cutting; and drying are performed in this order. Among them, in the cutting step, typically, a rotary cutter having one or two blades is used in a state where the noodle strands are drooped (e.g., Japanese Utility Model Laid-Open No. H07-5386(1995)).

However, when one tries to cut the drooped gelatinized noodle strands into noodle strands having a shorter length of approximately 1 to 10 cm, the noodle strands are sometimes scattered at the time of cutting. Reasons for this may be that if a rotational speed of the rotary cutter is increased more than before in order to shorten a length of the noodle strands, kinetic energy larger than before is given to the cut noodle strands; adhesive property of the gelatinized noodle strands is high and therefore the noodle strands are likely to adhere to the blades; and the noodle strand length is short and therefore a weight of the noodle strand after the cutting is small. If the noodle strands after the cutting are scattered, it may become difficult to distribute them on an equal amount basis.

On the other hand, there is proposed an apparatus that conveys a noodle sheet before manufacturing of the noodle strands on a conveyer in a horizontal direction, and cuts the noodle sheet on the conveyer with a rotary cutter from above (e.g., Japanese Patent Laid-Open No. S52-128277(1977)).

However, the apparatus disclosed in the Patent literature 2 is the one for cutting, not the noodle strands but the noodle sheet before manufacturing of the noodle strands. Also, the noodle sheet cut by the apparatus of the Patent literature 2 is not gelatinized. Further, the rotary cutter has only one blade, so that for cutting into short noodle strands having a length of approximately 1 to 10 cm, a rotational speed should be increased as described above, and therefore it is difficult to suppress scattering of the noodle strands after the cutting.

An object of the present invention is to solve the one or more problems inherent in the conventional techniques.

SUMMARY OF THE INVENTION

A first aspect of the present invention is a noodle strand cutting apparatus for cutting gelatinized noodle strands used in manufacturing of instant noodles, the noodle strand cutting apparatus comprising:
a conveyer for conveying at least one bundle of the gelatinized noodle strands; and
a rotary cutter arranged above the conveyer and intended to cut, to a predetermined length, the at least one bundle of the gelatinized noodle strands conveyed on the conveyer in a substantially horizontal direction, wherein
the rotary cutter comprises a plurality of blades that extend side by side with a rotational axis and in radial directions around the rotational axis, the plurality of blades being spaced from each other in a circumferential direction by predetermined intervals.

Preferably, the rotary cutter further comprises a control surface that extends between a pair of the blades adjacent to each other for controlling bounce up of the noodle strands after the cutting.

Preferably, the rotary cutter has four or more pieces of the blades in the circumferential direction.

Preferably, a distance from the control surface to a tip of the blade is equal to or less than 6 cm.

Preferably, the apparatus further comprises a drive unit that drives the conveyer and the rotary cutter so as to make speeds of the tips of the plurality of blades of the rotary cutter and an upper surface of the conveyer substantially equal to each other.

Another aspect of the present invention is a rotary cutter for cutting, to a predetermined length, at least one bundle of gelatinized noodle strands conveyed on a conveyer in a substantially horizontal direction, the cutter comprising:
a plurality of blades that extend side by side with a rotational axis and in radial directions around the rotational axis, the plurality of blades being spaced from each other in a circumferential direction by predetermined intervals.

Still another aspect of the present invention is a method for cutting gelatinized noodle strands used in manufacturing of instant noodles, the method comprising the steps of:
providing a noodle strand cutting apparatus, wherein the noodle strand cutting apparatus comprises
a conveyer for conveying at least one bundle of the gelatinized noodle strands, and
a rotary cutter arranged above the conveyer;
providing the rotary cutter with a plurality of blades that extend side by side with a rotational axis and in radial directions around the rotational axis, the plurality of blades being spaced from each other in a circumferential direction by predetermined intervals; and
pressing at least one of the plurality of blades of the rotary cutter against the at least one bundle of the gelatinized noodle strands conveyed on the conveyer in a substantially horizontal direction.

DESCRIPTION OF THE EMBODIMENTS

Figure 1:
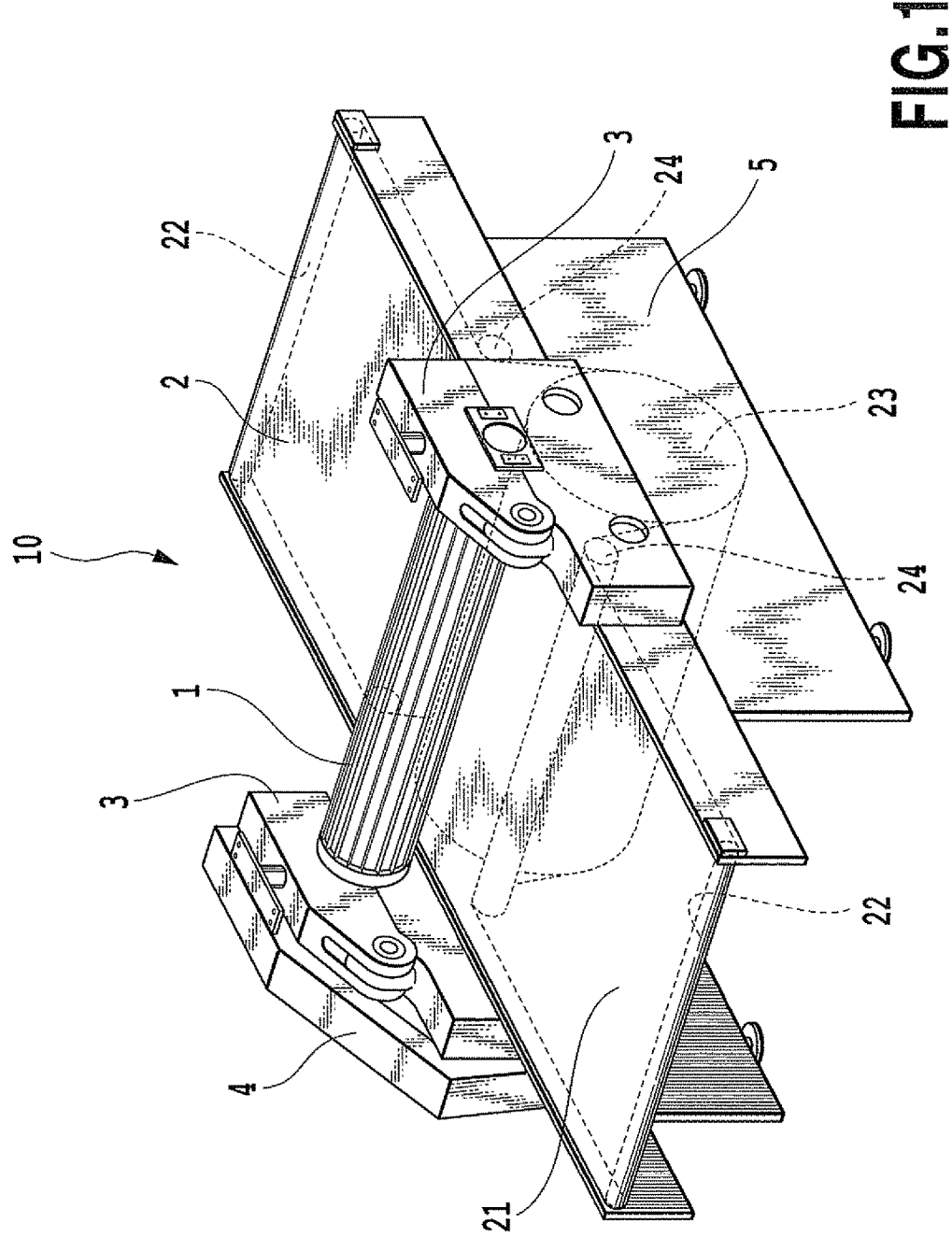
FIG. 1 is a perspective view of a noodle strand cutting apparatus in one embodiment of the present invention.

A preferred embodiment at the time of this disclosure will be most appropriately appreciated by referencing the drawings. As generally illustrated and exemplified in the drawings of this specification, it will be easily appreciated that constituents of this disclosure can be arranged and designed in various different configurations. The following detailed description is not intended to limit the scope of claims but simply represents the preferred embodiment at the present time.

Figure 2:
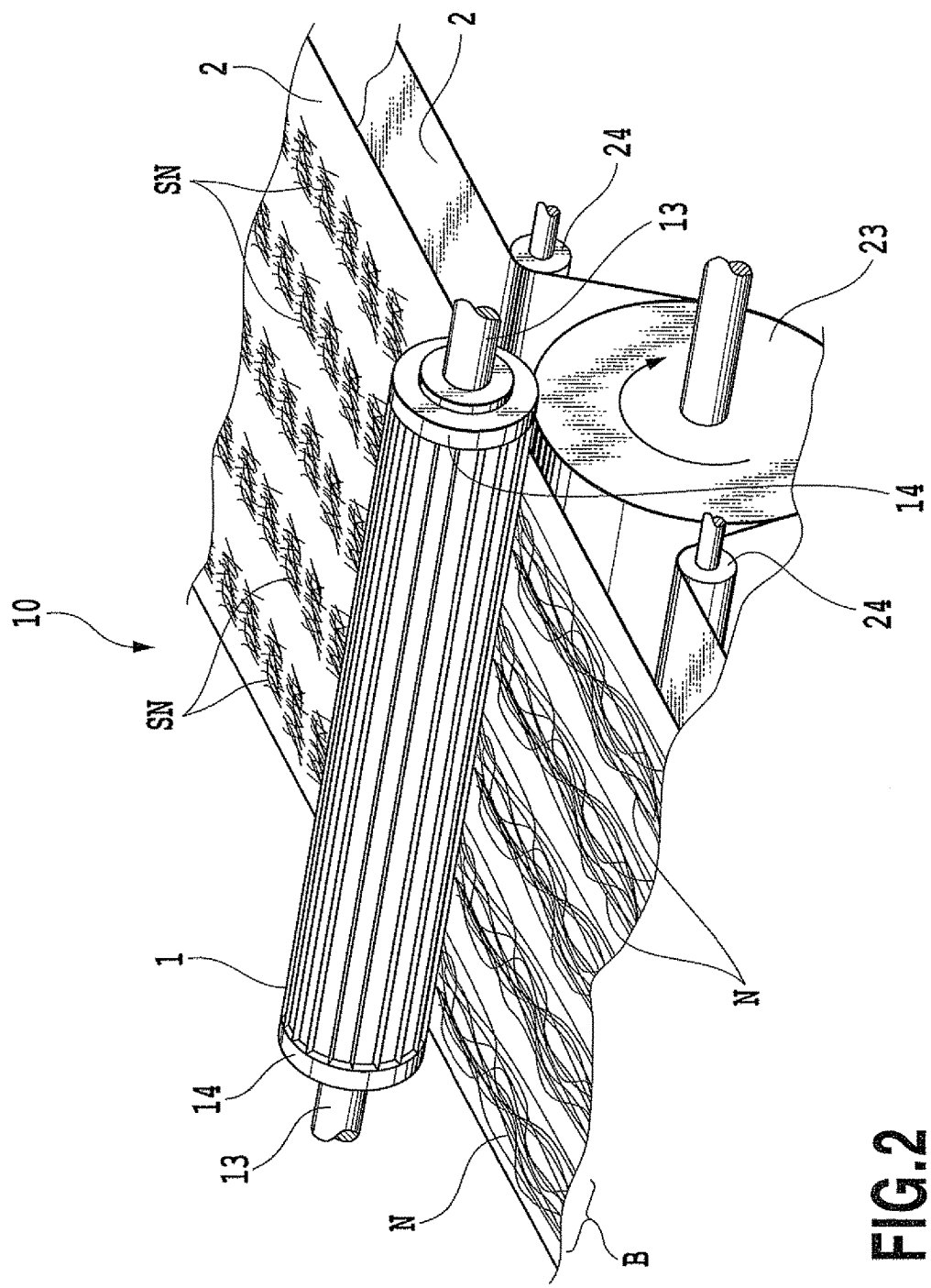
FIG. 2 is a perspective view of a main part illustrating a usage state of the noodle strand cutting apparatus.

FIG. 1 illustrates a noodle strand cutting apparatus 10 which is an embodiment of the present invention. The noodle strand cutting apparatus 10 is provided with a rotary cutter 1 and a conveyer 2 for conveying noodle strands. The rotary cutter 1 is arranged such that both ends of a rotary shaft 13 (see FIG. 2) thereof are supported by cutter supports 3 and that at the time of rotation, noodle strands N can be cut. The left and right cutter supports 3 are fixed to a frame 5.

The conveyer 2 is used to convey gelatinized noodle strands. The conveyer 2 is a typical belt conveyer, and has a conveyer belt 21 and front and rear end rolls 22. The conveyer is arranged such that an upper surface thereof is substantially horizontal; however, the upper surface may be slanted to the extent that the noodle strands after cutting do not move. A material for the conveyer belt 21 can be selected from various materials such as rubber and plastic, and is not particularly limited.

Inside the conveyer 2, a backup roll 23 (see FIG. 2) and two internal rolls 24 are provided, and at a position where a tip of the rotary cutter 1 comes into contact with the conveyer belt 21, the backup roll 23 faces to the rotary cutter 1 with sandwiching the conveyer belt 21.

The frame 5 has a drive part 4 (see FIG. 1) fixed thereto. The drive part 4 is configured to include an unillustrated motor, a plurality of pulleys, belt, and a plurality of gears so that power of the motor is transferred through the plurality of pulleys, belt, and plurality of gears and distributed to the rotary cutter 1 and backup roll 23. The drive part 4 can drive the rotary cutter 1 and conveyer 2 in synchronization with each other. The backup roll 23 is driven by the power of the motor to give conveying force to the conveyer belt 21. The backup roll 23 suppresses the conveyer belt 21 from moving down (or moving back from the rotary cutter 1), and therefore the noodle strands N can be stably cut.

Figure 3:
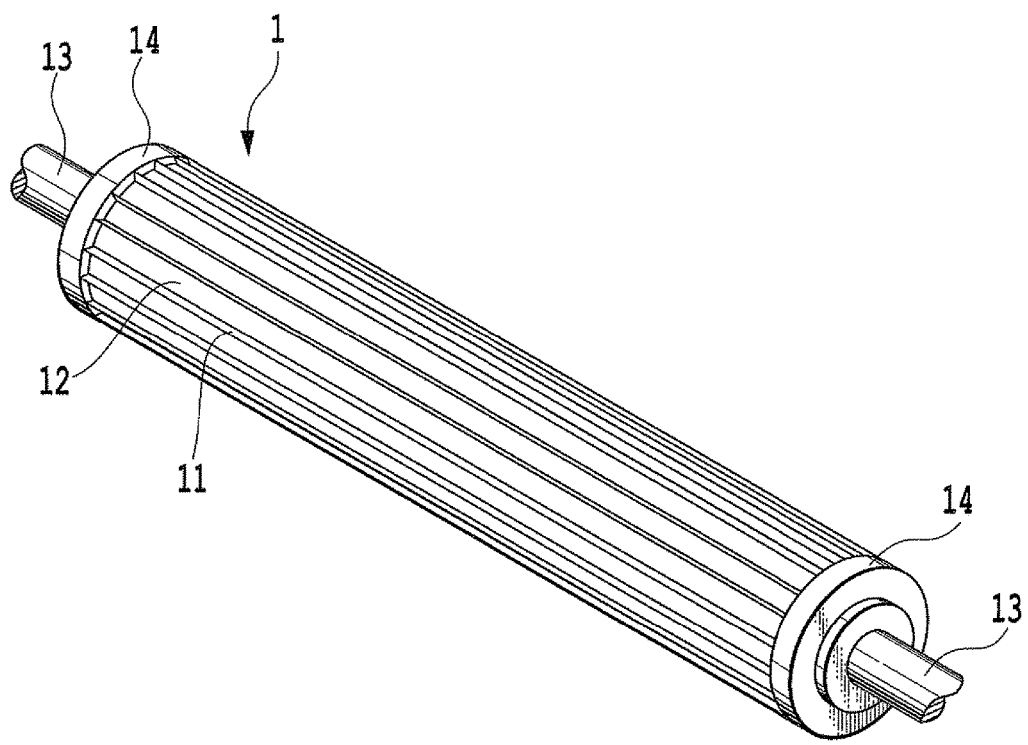
FIG. 3 is perspective view illustrating a rotary cutter.

As illustrated in FIG. 3, the rotary cutter 1 has a main body 12 having a substantially columnar shape, and the main body 12 is integrally formed with a plurality of blades 11. Along an axis line, i.e., a rotation center of the main body 12, a rotary shaft 13 is fixed. The rotary shaft 13 is connected to the motor of the drive part 4 to obtain a predetermined rotating force.

Figure 6:
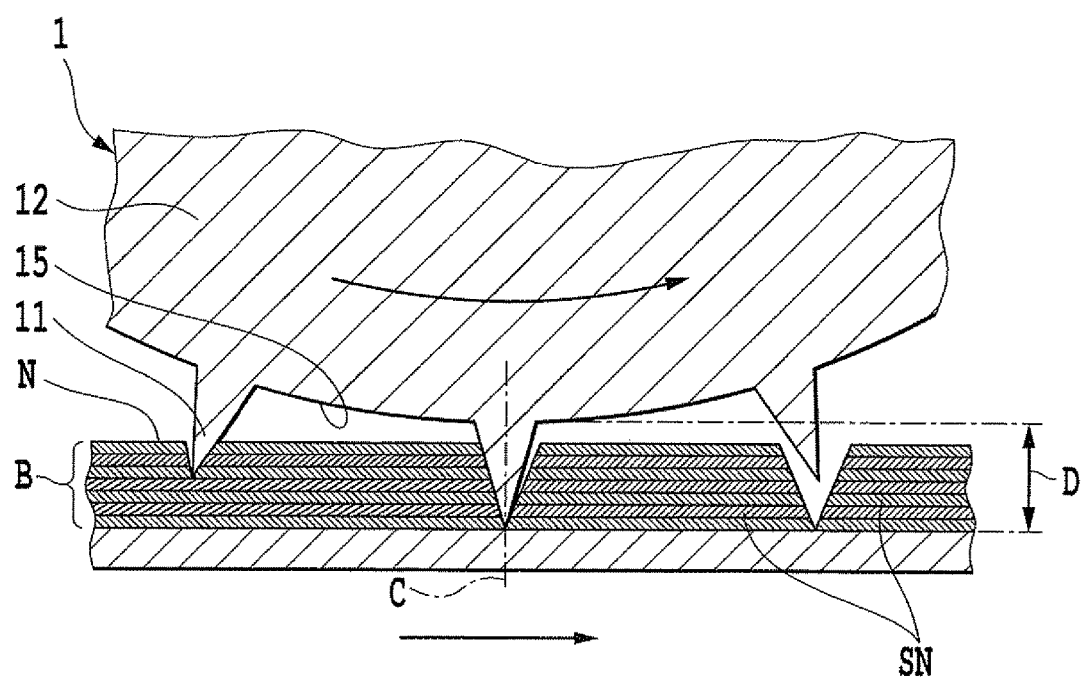
FIG. 6 is an enlarged view of the main part illustrating a relationship between the rotary cutter and noodle strands in the usage state.

Each of the blades 11 is generally wedge shaped, and any of the blades 11 is arranged so as to extend in a radial direction around the rotary shaft 13. "Extend in a radial direction" in this specification refers to that a center line or center plane C (see FIG. 6) of the blade 11 in its thickness direction in a side view is angled so as to be directed to a radial direction compared to a direction of a tangential line of a surface of the main body 12 passing through a base part of the blade 11. The center line or center plane C of the blade 11 in its thickness direction may correspond to a radial direction of the main body 12, and falls within a predetermined range of less than ±90° in a rotational direction from the radial direction, more preferably within a range of ±10°, and most preferably within a range of ±5°. A shape of the blade 11, and an angle formed by the blade 11 with respect to the radial direction of the main body 12 can be designed in consideration of viscosity of applied noodle strands N. The blade 11 may be a helical blade of which a position changes in a circumferential direction of the main body 12 over its longitudinal direction. The blade 11 may be divided into a plurality of pieces in a shaft direction of the main body 12, and rotational positions or phases of them may be mutually shifted along the shaft direction.

The material of the blade 11 can be selected from any materials, and for example, stainless steel or other metal, or plastics is preferably used as the material. The blades 11 may be fixed to the main body 12 after formation of the main body 12. The main body 12 may be hollow or solid. The rotary cutter 1 may be manufactured by combining a plurality of mutually different materials, for example, combining metal and plastics. Part or all of at least one of the surfaces of blades 11 and main body 12 may be covered with a material layer having detachment facilitating property or attachment suppressing property, such as polytetrafluoroethylene.

Figure 4:
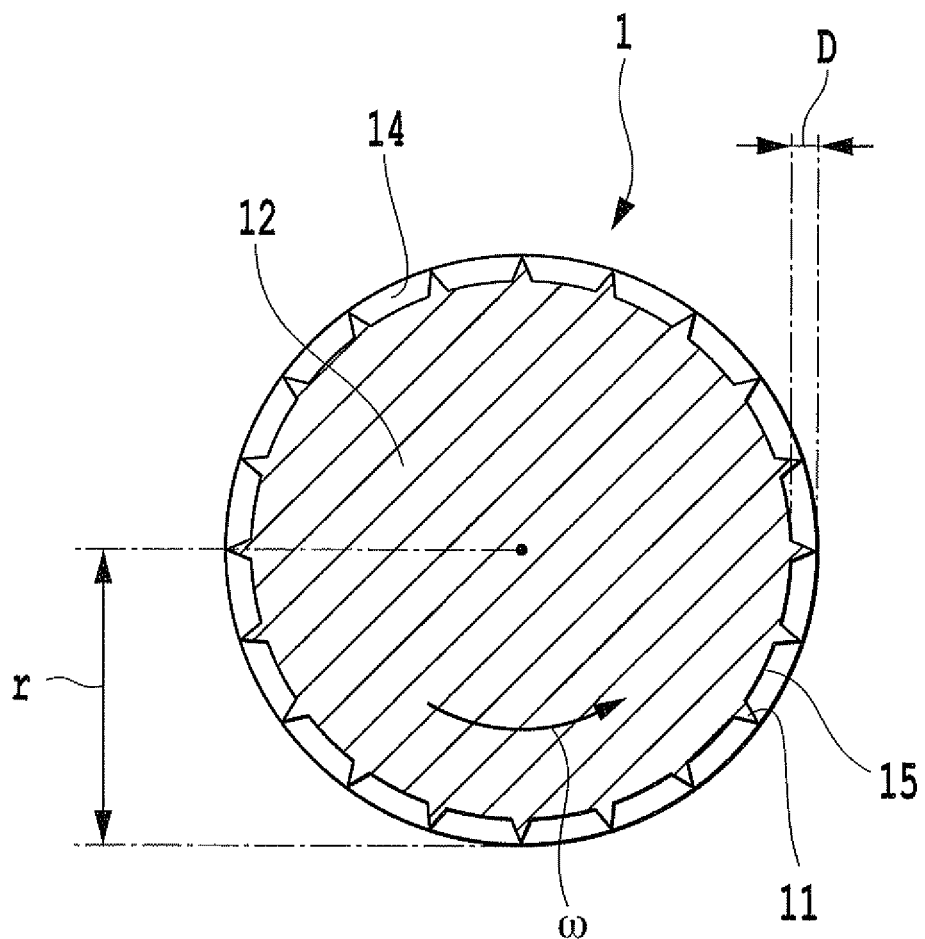
FIG. 4 is a cross sectional view of the rotary cutter.
Figure 5:
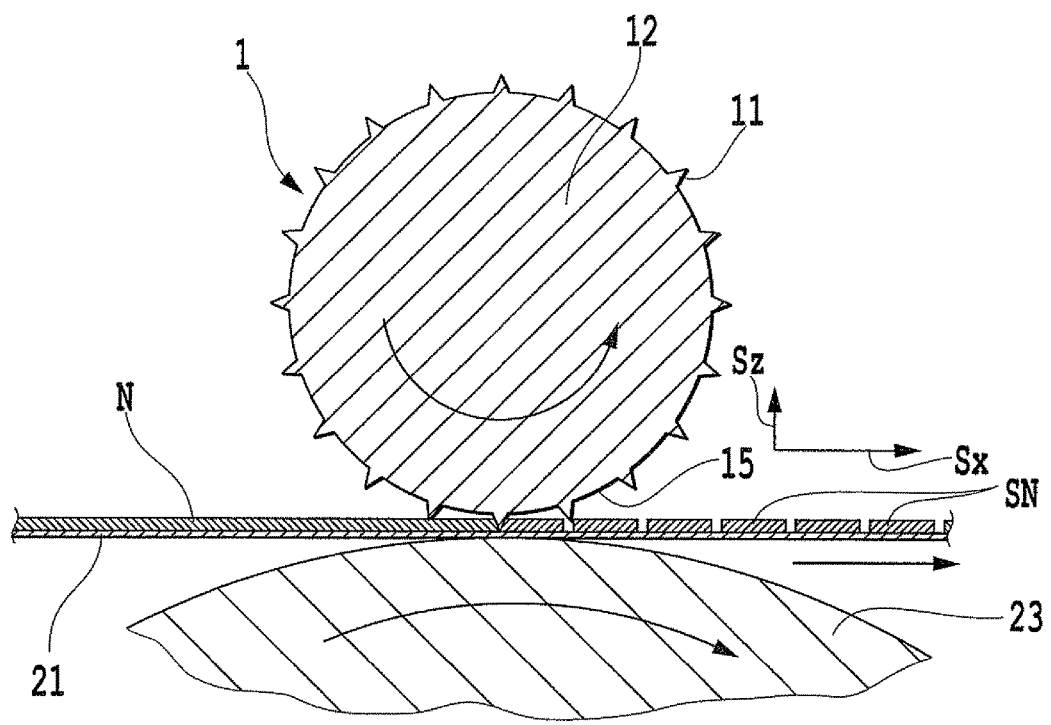
FIG. 5 is a cross sectional view illustrating the usage state of the noodle strand cutting apparatus.

As illustrated in FIG. 4, the plurality of blades 11 of the rotary cutter 1 are arranged in the circumferential direction of the main body 12 at regular angle intervals. The rotary cutter 1 is driven by the drive part 4 so as to rotate at a circumferential speed substantially equal to a conveying speed for the gelatinized noodle strands N. An interval between tips of two blades 11 adjacent to each other substantially corresponds to a length of short noodle strands after the cutting. Assuming that lengths of the short noodle strands SN after the cutting are made to have a constant value, as the number of blades 11 is decreased, a rotation radius r of the tips of the blades 11 decreases, and an angular velocity co of the rotation increases. However, as the number of blades 11 is decreased, an upward speed component Sx (see FIG. 5) of the tip of the blade 11 after cutting the noodle strands N increases, and therefore the short noodle strands SN after the cutting are likely to be scattered. Accordingly, in order to suppress the short noodle strands SN from being scattered, it is desirable to configure a plurality of blades 11. If the number of blades 11 is three or more, two or more blades 11 can simultaneously come into contact with a bundle of the noodle strands N to thereby preferably suppress the short noodle strands SN after the cutting from being scattered. According to experiments conducted by the present inventors, it is particularly preferable to set the number of blades 11 to four or more, and six to thirty is further preferable. Most preferably, the number of blades 11 is ten to twenty five. Note that in the present embodiment, the case of twenty blades is illustrated in FIG. 4.

A distance from the rotation center of the rotary cutter 1 to the tip (i.e., the rotation radius r of the tip) is not particularly limited, but preferably is approximately 3 to 25 cm. The rotation radius r can be changed depending on a manufacturing scale.

Above the short noodle strands SN immediately after the cutting, a control surface 15 that is the surface of the main body 12 of the rotary cutter 1 comes close. Immediately after the cutting, the control surface 15, and a pair of blades 11 sandwiching it, form a substantially closed space or quasi-closed space in a rotational direction to the extent that the short noodle strands SN do not come out of the space. For this reason, the short noodle strands SN after the cutting are unlikely to bounce upward, and also for this reason, the scattering of the short noodle strands SN can be suppressed. Typically, a thickness (height) of the bundle B (see FIG. 7) of the noodle strands N conveyed on the conveyer 2 is generally equal to or less than 6 cm. For this reason, a distance D from the control surface 15 of the main body 12 to the tip of the blade 11 is preferably equal to or less than 6 cm that corresponds to the thickness of the bundle B of the noodle strands N. As a result, the scattering of the short noodle strands SN immediately after the cutting can be suppressed by the control surface 15 that comes close to a top part of the short noodle strands SN immediately after the cutting.

Referring again to FIG. 3, at both end parts of the main body 12 in the axial direction, disk-shaped protectors 14 are provided. A radius of the protector 14 is set to be substantially equal to the rotation radius r of the tip of the blade 11. By the protectors 14, a time period during which the tip of the blade 11 is in contact with the conveyer belt 21 can be shortened, and stress of the blade 11 on the conveyer belt 21 can be suppressed. The protectors may be provided in the middle of the rotary cutter 1 in the axial direction, or may be provided at two or more mutually different positions. In the case of providing the protectors in the middle in the axial direction, the noodle strands N may be separated into a plurality of bundles B by the protectors. A material for the protectors 14 is arbitrary, and as the material, for example, resin is preferably used. However, whether or not the protectors 14 are provided is arbitrary. The rotary cutter 1 configured as described above can be separately manufactured and sold (i.e., independently of the noodle strand cutting apparatus 10).

Above the rotary cutter 1, a cover (not illustrated) may be provided to suppress the scattering of the short noodle strands SN. The cutter support parts 3 and/or the conveyer 2 are preferably provided with a mechanism that can adjust a relative distance between the rotation center of the rotary cutter 1 and the conveyer 2.

The noodle strand cutting apparatus of the present embodiment is used as a part of a line of a series of processing apparatuses for manufacturing instant noodles. The processing apparatus line is provided with a rolling apparatus, splitting apparatus, and steaming apparatus all of which are not illustrated. The rolling apparatus rolls a dough to form a plate-like noodle sheet. The splitting apparatus thinly cuts the noodle sheet to manufacture noodle strands N. The steaming apparatus heats the noodle strands N to gelatinize them. A plurality of bundles B of the noodle strands N gelatinized by the steaming apparatus are supplied to the noodle strand cutting apparatus 10 of the present embodiment. In stead of the steaming apparatus, a boiling apparatus may be used, and in the gelatinization step in the steaming apparatus or boiling apparatus, superheated steam can be used. The number of bundles B of the noodle strands N supplied to the noodle strand cutting device 10 may be any number.

The noodle strands N to be cut in the present invention includes various types of noodles such as Chinese noodles, white wheat noodles (udon), buckwheat noodles (soba), and pastas. The noodle strands N may be waved or straight.

Figure 7:
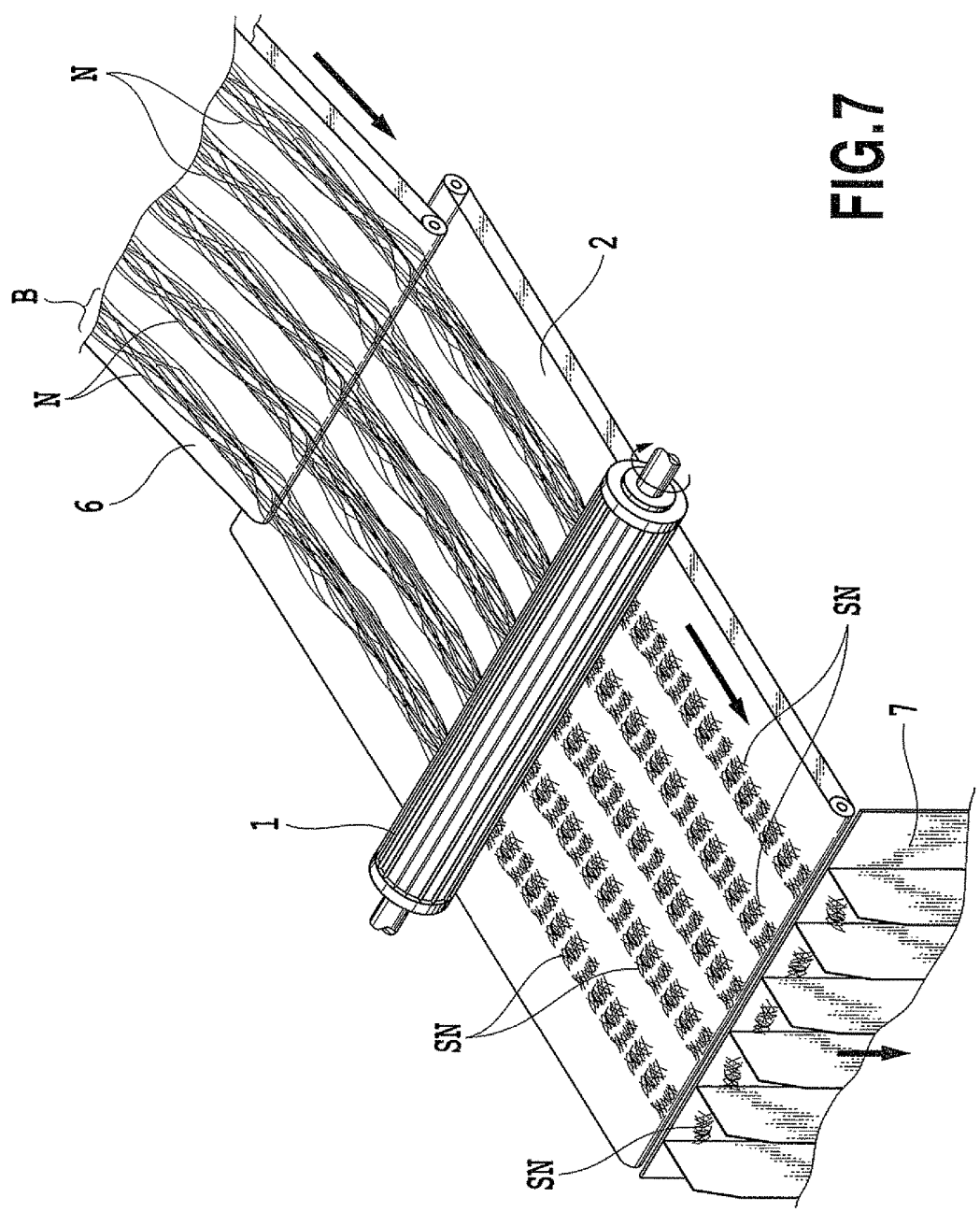
FIG. 7 is a perspective view illustrating the usage state of the noodle strand cutting apparatus and components on front and rear side of the apparatus.

Operation of the noodle strand cutting apparatus 10 of the present embodiment configured as described above is described. As illustrated in FIG. 7, when the plurality of bundles B of the gelatinized noodle strands N are transferred to the conveyer 2 of the noodle strand cutting apparatus from the steaming apparatus through a conveyer 6, the noodle strands N is cut into the short noodle strands SN having a length of approximately 1 to 10 cm by the noodle strand cutting apparatus 10. The short noodle strands SN after the cutting are stored in an unillustrated retainer from the conveyer 2 through a chute part 7. The retainer storing these short noodle strands SN is subjected to drying treatment such as oil heat drying or hot air drying to complete instant noodle strands.

In the noodle strand cutting apparatus 10 of the present embodiment, the rotary cutter 1 is provided with a plurality of blades 11, and therefore particularly preferable for cutting the gelatinized noodle strands N into the short noodle strands SN having a length of 1 to 10 cm. In other words, by configuring a plurality of blades 11, a rotation angle of the rotary cutter 1 from a cut to a next cut can be decreased to continuously perform the cutting into the short noodle strands SN at a small rotation angle. On the other hand, as a result of configuring a plurality of blades 11, the upward speed component Sz (see FIG. 5) of the tip after cutting the noodle strands N can be suppressed, and therefore the scattering of the short noodle strands SN after the cutting can be suppressed. Also, as a result of configuring the plurality of blades 11, the angular velocity ω of the rotary cutter 1 is suppressed, so that a centrifugal force $f=mr\omega^2$ (m is a mass, r is a rotation radius, and ω is an angular velocity) acting on the short noodle strands SN adhered to the blade 11 can be reduced, and kinetic energy given to the short noodle strands SN at the time of detachment from the blade 11 can be suppressed to suppress the scattering of the short noodle strands SN.

Also, since a plurality of blades 11 extend in the radial directions around the rotational axis of the rotary cutter 1, as compared with the case where the blades are arranged to extend in directions tangential to the surface of the main body 12, a direction of cutting surfaces of the noodle strands N becomes close to a transverse direction of the noodle strands N, which can reduce cross sectional areas of the cutting surfaces, suppress adhesion to the blades 11, and suppress scattering of the short noodle strands SN.

Also, the rotary cutter 1 is further provided with the control surfaces 15 that extend between pairs of blades 11 adjacent to each other, and these control surfaces 15 control the bounce up of the short noodle strands SN after cutting, so that scattering of the short noodle strands SN can be suppressed.

Also, the drive part 4 drives the conveyer 2 and the rotary cutter 1 so as to make the speeds of the tips of the plurality of blades 11 of the rotary cutter 1 and the upper surface of the conveyer 2 substantially equal to each other, and therefore in the process of the cutting, scattering of the short noodle strands SN caused by interference of the blades 11 can be suppressed.

The embodiment of the present invention should be considered as the representative of a principle of the present invention, and with the understanding that the present invention shall not be limited to the exemplified embodiment, the specific embodiment of the present invention illustrated and described in this specification is presented. Various other embodiments are obvious to one having ordinary skill in the art, and will be easily carried out by one having ordinary skill in the art without departing from the scope and spirit of the present invention.

For example, a drive unit may be configured such that a relative position between the rotary cutter 1 and the conveyer 2 changes during the cutting. On a surface of the backup roll 23, grooves that synchronously face to the blades 11 may be formed. In the present embodiment, the noodle strand cutting apparatus 10 that is an independent module only cutting noodle strands is described; however, the noodle strand cutting apparatus may be integrated with one or more apparatuses that perform other processing steps, or the noodle strand cutting apparatus may serve as a part of another apparatus. It should be appreciated that even in such a case, a relevant part corresponds to the noodle strand cutting apparatus of the present invention. The scope of the present invention will be determined by the appended claims and their equivalents.

What is claimed is:

1. A method for cutting gelatinized noodle strands used in manufacturing of instant noodles, the method comprising:
   providing at least one bundle of the noodle strands that are longitudinally cut and gelatinized by heating,
   providing a noodle strand cutting apparatus comprising:
      a conveyer that conveys the at least one bundle of the noodle strands, the conveyer includes a flat surface that extends lengthwise in a horizontal direction, and the at least one bundle of the noodle strands being conveyed on the conveyer in a substantially horizontal direction, and
      a rotary cutter arranged above the conveyer, the rotary cutter being configured to cut the at least one bundle of the gelatinized noodle strands to a predetermined length from 1 to 10 cm, and a length of the flat surface of the conveyer is greater than a diameter of the rotary cutter, wherein
      the rotary cutter comprises:
         a plurality of blades that extend side by side along a peripheral surface of the rotary cutter and in radial directions around a rotational axis of the rotary cutter, the plurality of blades being spaced from each other in a circumferential direction by predetermined intervals, the plurality of blades being configured to directly contact the at least one bundle of the gelatinized noodle strands and the flat surface of the conveyer during cutting by the rotary cutter, and a number of blades is between six and thirty blades, inclusive, and
         a curved control surface that extends between a pair of the blades adjacent to each other, wherein: (i) a distance from the curved control surface to a tip of each of the plurality of blades, respectively, is shorter than a distance between each of the plurality of blades, and (ii) a clearance exists between the curved control surface and the at least one bundle of the gelatinized noodle strands when the at least one bundle of the gelatinized noodle strands are cut,
   pressing at least one of the plurality of blades of the rotary cutter against the at least one bundle of the gelatinized noodle strands, and
   cutting the at least one bundle of the gelatinized noodle strands by the rotary cutter.

2. The method according to claim 1, wherein the distance from the control surface to the tip of each of the plurality of blades, respectively, is equal to or less than 6 cm.

3. The method according to claim 1, wherein the noodle strand cutting apparatus further comprises a drive unit that drives the conveyer and the rotary cutter so as to make a speed of the tip of each of the plurality of blades and an upper surface of the conveyer substantially equal to each other.

4. The method of claim 1, wherein the plurality of blades extend along substantially an entire length of the rotary cutter from a first end of the rotary cutter to a second end of the rotary cutter.

5. The method of claim 1, wherein the control surface is made of plastics.

6. The method of claim 1, wherein the plurality of blades are covered with a material layer having detachment facilitating properties.

7. The method of claim 6, wherein the material layer is polytetrafluoroethylene.

8. The method of claim 1, wherein the adjacent blades and the conveyer form a substantially closed space such that the cut noodle strands stay within the space immediately after being cut.

9. The method of claim 1, wherein each of the plurality of blades is shaped like a wedge.

10. The method of claim 1, wherein the rotary cutter is configured to cut a plurality of bundles of the noodle strands at the same time.

* * * * *